United States Patent
Lee et al.

(10) Patent No.: US 7,659,643 B2
(45) Date of Patent: Feb. 9, 2010

(54) LINEAR MOTOR AND LINEAR COMPRESSOR USING THE SAME

(75) Inventors: Hyeong Kook Lee, Sungnam-shi (KR); Kyeong Bae Park, Seoul (KR); Jung Sik Park, Seoul (KR); Eon Pyo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 436 days.

(21) Appl. No.: 11/565,008

(22) Filed: Nov. 30, 2006

(65) Prior Publication Data

US 2007/0152516 A1    Jul. 5, 2007

(30) Foreign Application Priority Data

Nov. 30, 2005    (KR) .................... 10-2005-0115683

(51) Int. Cl.
*H02K 33/00* (2006.01)
(52) U.S. Cl. ........................................ 310/15
(58) Field of Classification Search ............ 310/12–15, 310/166; 417/415
See application file for complete search history.

(56) References Cited

U.S. PATENT DOCUMENTS

| | | | |
|---|---|---|---|
| 6,914,353 B2 | 7/2005 | Hong et al. | 310/13 |
| 6,917,127 B2 | 7/2005 | Hong et al. | 310/14 |
| 2004/0223861 A1* | 11/2004 | Lee | 417/410.1 |
| 2004/0245862 A1* | 12/2004 | Hong et al. | 310/12 |
| 2005/0053471 A1 | 3/2005 | Hong et al. | 417/44.11 |
| 2005/0057111 A1 | 3/2005 | Han et al. | 310/166 |
| 2005/0184687 A1 | 8/2005 | Hong et al. | 318/66 |
| 2007/0007842 A1 | 1/2007 | Shim et al. | 310/166 |

FOREIGN PATENT DOCUMENTS

KR    10-2002-0066603    8/2002

OTHER PUBLICATIONS

U.S. Appl. No. 11/565,018 to Park et al., filed Nov. 30, 2006.
U.S. Appl. No. 11/558,985 to Park etal., filed Nov. 13, 2006.
English Language Abstract of KR 10-2002-0066603.

* cited by examiner

*Primary Examiner*—Javaid Nasri
(74) *Attorney, Agent, or Firm*—Birch, Stewart, Kolasch & Birch, LLP

(57)    ABSTRACT

There are provided a linear motor and the linear compressor using the linear motor. The linear motor includes a bobbin, a coil wound in the bobbin, an outer core provided on the bobbin, an inner core provided to perform a linear reciprocating motion with a moving body, and a magnet provided on the inner core so that the inner core and the moving body perform a linear reciprocating motion. The magnet is configured to provide a gap between the magnet and an outer core and to be in close contact to the inner core.

29 Claims, 3 Drawing Sheets

LINEAR MOTOR AND LINEAR COMPRESSOR USING THE SAME

This application claims the benefit of the Korean Application No. 10-2005-0115683 filed on Nov. 30, 2005, the disclosure of which is hereby incorporated by reference in its entirety.

BACKGROUND OF THE INVENTION

1. Field of the Invention

The present invention relates to a linear motor and a linear compressor using the same. More particularly the present invention relates to a linear motor and a linear compressor using the same which removes a gap of a magnet and an inner core and in which the inner core is formed to be longer than an outer core.

2. Description of the Background Art

In general, a linear motor generates a linear reciprocating force and applies the force to a linear reciprocating object (hereinafter, referred to as "a moving body") such as a piston and generally includes a stator in which a coil is provided and a rotor for performing a linear reciprocating motion of the moving body by a reciprocal action with the stator.

Recently, a linear compressor, etc. for compressing a fluid such as a refrigerant gas using the linear motor has been developed.

The stator includes a bobbin, a coil wound in the bobbin, an outer core radially provided in the bobbin, and an inner core provided to be spaced at the inside of an outer stator.

The rotor is a magnet which performs a linear reciprocating motion between the outer core and the inner core by an interaction with a magnetic force generated when a current is applied to the coil.

The magnet has an outer gap g1 between the magnet and an inner circumferential surface of the outer core and an inner gap g2 between the magnet and an outer circumferential surface of the inner core to perform a linear reciprocating motion between the outer core and the inner core.

A force (output) of the linear motor is determined by a motor force constant (a) and a current value (i) applied to the coil, where the motor force constant is proportional to a magnetic flux density (Bm) within a gap by the magnet, so that efficiency of the motor improves as a magnetic flux density (Bm) within a gap by the magnet increases.

Here, as shown in Equation 1, the magnetic flux density (Bm) within the gap becomes large as the outside gap (g1) and the inside gap (g2) become small.

$$Bm = Br \times t / 2(g1 + g2 + t) \quad \text{<Equation 1>}$$

where Br is a magnetic flux density (characteristic) within a magnet, t is a thickness of the magnet, and 2(g1+g2+t) is a gap of a linear motor.

That is, a force (output) of the linear motor and the linear compressor using the linear motor becomes large as a gap of the linear motor becomes small.

However, in a conventional linear motor and a linear compressor using the linear motor, because there are gaps in the inside as well as the outside of the magnet, a magnetic resistance for disturbing a magnet force becomes large. Thus, there is a problem that an using amount of the magnet increases to improve their output and their productivity is low because the inside gap as well as the outside gap should be managed to obtain a stable motor performance.

SUMMARY OF THE INVENTION

Accordingly, an object of the present invention is to solve at least the problems and disadvantages of the background art.

An object of the present invention is to provide a linear motor and a linear compressor using the linear motor which can minimize an amount of using a magnet in the same performance or increase their output when an amount of using the magnet is the same, by minimizing a gap and maximize their output by minimizing a reverse force operating when the magnet is moved by allowing an inner core to be longer than an outer core.

According to an aspect of the present invention, there is provided a linear motor including: a bobbin; a coil wound in the bobbin; an outer core provided on the bobbin; an inner core configured to perform a linear reciprocating motion together with a the moving body, the inner core having a length thereof longer than the outer core; and a magnet provided on the inner core so that the inner core and the moving body perform a linear reciprocating motion, the magnet configured to provide a gap between the magnet and the outer core.

The length of the inner core be longer than a sum of a length of the outer core and a stroke of the moving body.

The magnet may be provided to come in close contact with an outer circumferential surface of the inner core.

The magnet may be adhered to the outer circumferential surface of the inner core by an adhesive or a carbon film.

The magnet may be configured such that one end of the magnet is out of one pole of the outer core when the moving body is advanced to the maximum or is withdrawn to the maximum.

The linear motor may further include a first holder and a second holder which are provided on an outer circumferential surface of the inner core, wherein the first holder is configured to lock in a front end portion of the magnet by surrounding a front end surface and a circumferential outer surface of the front end portion, and the second holder is configured to lock in a rear end portion of the magnet by surrounding a rear end surface and a circumferential outer surface of the rear end portion.

The linear motor may further include a core frame configured to be coupled to the moving body and provided with the inner core therein.

The inner core may be bonded on an outer circumferential surface of the core frame by an adhesive or fastened by a fastening member.

The moving body, the core frame, the inner core, the magnet, the outer core, and an assembly of the bobbin and the coil may be sequentially arranged in an outward direction from the center of the linear motor.

According to another aspect of the present invention, there is provided a linear compressor including: a cylinder; a piston positioned in the cylinder to perform a linear reciprocating motion; a bobbin; a coil wound in the bobbin; an outer core provided in the bobbin; an inner core configured to perform a linear reciprocating motion together with a piston, the inner core having a length thereof longer than the outer core; and a magnet provided in the inner core so that the inner core and the piston perform a linear reciprocating motion, the magnet configured to provide a gap between the magnet and the outer core.

The length of the inner core may be equal to or longer than a sum of a length of the outer core and a stroke of the piston.

The magnet may be provided to come in close contact with an outer circumferential surface of the inner core.

The magnet may be adhered to the outer circumferential surface of the inner core by an adhesive or a carbon film.

The magnet may be configured such that one end of the magnet is out of one pole of the outer core when the moving body is advanced to the maximum or is withdrawn to the maximum.

The linear compressor may further include a first holder and a second holder which are provided on an outer circumferential surface of the inner core, wherein the first holder is configured to lock in a front end portion of the magnet by surrounding a front end surface and a circumferential outer surface of the front end portion, and the second holder is configured to lock in a rear end portion of the magnet by surrounding a rear end surface and a circumferential outer surface of the rear end portion.

The inner core may have a front groove provided on an outer circumferential surface to fasten the first holder and a rear groove provided on an outer circumferential surface to fasten the second holder, wherein the first groove and the second groove are spaced from each other in a front-rear direction.

The inner core may be bonded on an outer circumferential surface of the core frame by an adhesive or fastened by a fastening member.

The linear compressor may further include a core frame configured to be coupled to the piston and provided with the inner core therein.

The piston, the cylinder, the core frame, the inner core, the magnet, the outer core, and an assembly of the bobbin and the coil may be sequentially arranged in an outward direction from the center of the linear compressor.

According to still another aspect of the present invention, there is provided a linear compressor including: a cylinder; a piston provided in the cylinder to perform a linear reciprocating motion, the piston provided with a flow channel that a fluid passes through; a suction valve provided in a front surface of the piston to open or shut a flow channel of the piston; a bobbin; a coil wound in the bobbin; an outer core provided on the bobbin; an inner core provided to perform a linear reciprocating motion together with the piston, the inner core having a length thereof longer than the outer core; and a magnet provided in the inner core so that the inner core and the piston perform a linear reciprocating motion, the magnet configured to provide a gap between the magnet and the outer core; a cylinder block provided at the outside of the cylinder and disposed in the front of the outer core; an outer cover provided in a rear of the outer core; a rear cover which is fastened in the outer cover, the rear cover provided with a fluid suction hole therein; a spring supporter provided in a rear end of the piston, the spring supporter including a first spring interposed between the outer cover and the spring supporter and a second spring interposed between the rear cover and the spring supporter; and a discharge valve assembly provided in the cylinder block to form a compression chamber within the cylinder and opening or shutting the cylinder by an internal pressure of the compression chamber.

The length of the inner core may be configured to be longer than a sum of a length of the outer core and a stroke of the piston.

The magnet may be provided to come in close contact with an outer circumferential surface of the inner core.

The magnet may be adhered to the outer circumferential surface of the inner core by an adhesive or a carbon film.

The magnet may be configured such that one end of the magnet is out of one pole of the outer core when the moving body is advanced to the maximum or is withdrawn to the maximum.

The linear compressor may further include a first holder and a second holder which are provided on an outer circumferential surface of the inner core, wherein the first holder is configured to lock in a front end portion of the magnet by surrounding a front end surface and a circumferential outer surface of the front end portion, and the second holder is configured to lock in a rear end portion of the magnet by surrounding a rear end surface and a circumferential outer surface of the rear end portion.

The inner core may have a front groove provided on an outer circumferential surface to fasten the first holder and a rear groove provided on an outer circumferential surface to fasten the second holder, wherein the first groove and the second groove are spaced from each other in a front-rear direction.

The linear compressor may further include a core frame configured to be coupled to the piston and provided with the inner core therein.

The piston, the cylinder, the core frame, the inner core, the magnet, the outer core, and an assembly of the bobbin and the coil may be sequentially arranged in an outward direction from the center of the linear compressor.

In a linear motor and a linear compressor using the linear motor according to the present invention having the above-mentioned construction, an inner core is provided to perform a linear reciprocating motion with a moving body and a magnet is provided in the inner core so that the inner core and the moving body perform a linear reciprocating motion and has a gap between the magnet and an outer core but does not have a gap between the magnet and the inner core. Thus it is possible to minimize an amount of using the magnet in the same performance or increase their output when an amount of using the magnet is the same and as the inner core is formed to be longer than the outer core. A reverse force generated in a direction opposite to a movement direction of the magnet can be minimized when the magnet performs a linear reciprocating motion, so that it is possible to minimize a decline output which can occur when the inner core is equal to or shorter than the outer core.

Furthermore, in the linear motor and the linear compressor using the linear motor according to the present invention, because the inner core has a length longer than the sum of a length of the outer core and a stroke of the moving body, a reverse force is not generated in a direction opposite to a movement direction of a magnet when the magnet performs a linear reciprocating motion, so that it is possible to prevent an output decline.

Furthermore, the linear motor and the linear compressor using the linear motor according to the present invention further includes a core frame which is coupled to the moving body and in which the inner core is provided, so that it is possible to easily provide the inner core when it is difficult to directly provide the inner core in the moving body.

BRIEF DESCRIPTION OF THE DRAWINGS

The invention will be described in detail with reference to the following drawings in which like numerals refer to like elements.

DETAILED DESCRIPTION OF PREFERRED EMBODIMENTS

Hereinafter, exemplary embodiments of a linear motor according to the present invention will be described in detail with reference to the accompanying drawings.

Figure 1:
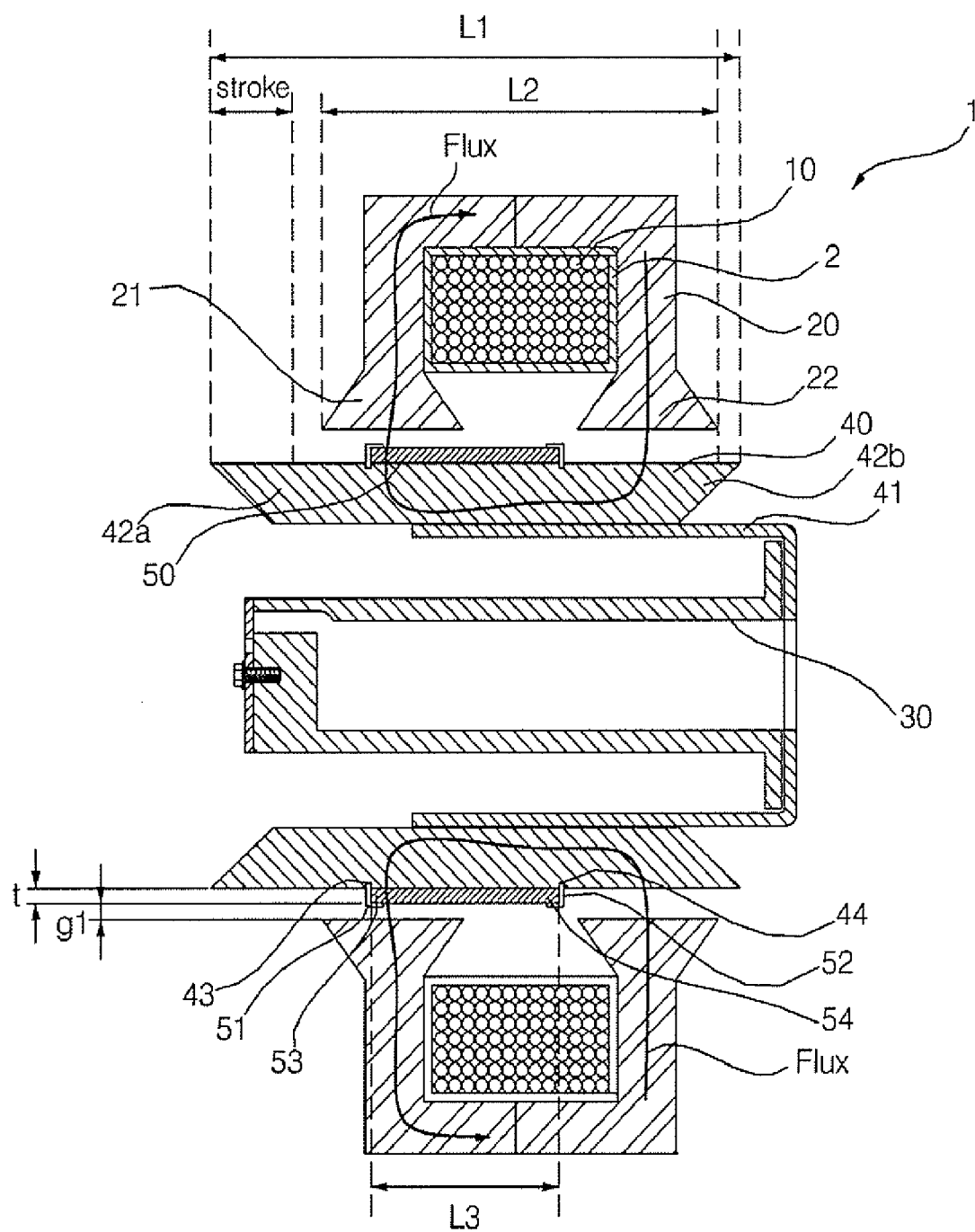
FIG. 1 is a partially longitudinal cross-sectional view illustrating a state where a moving body is advanced to the maximum in an embodiment of a linear motor according to the present invention.
Figure 2:
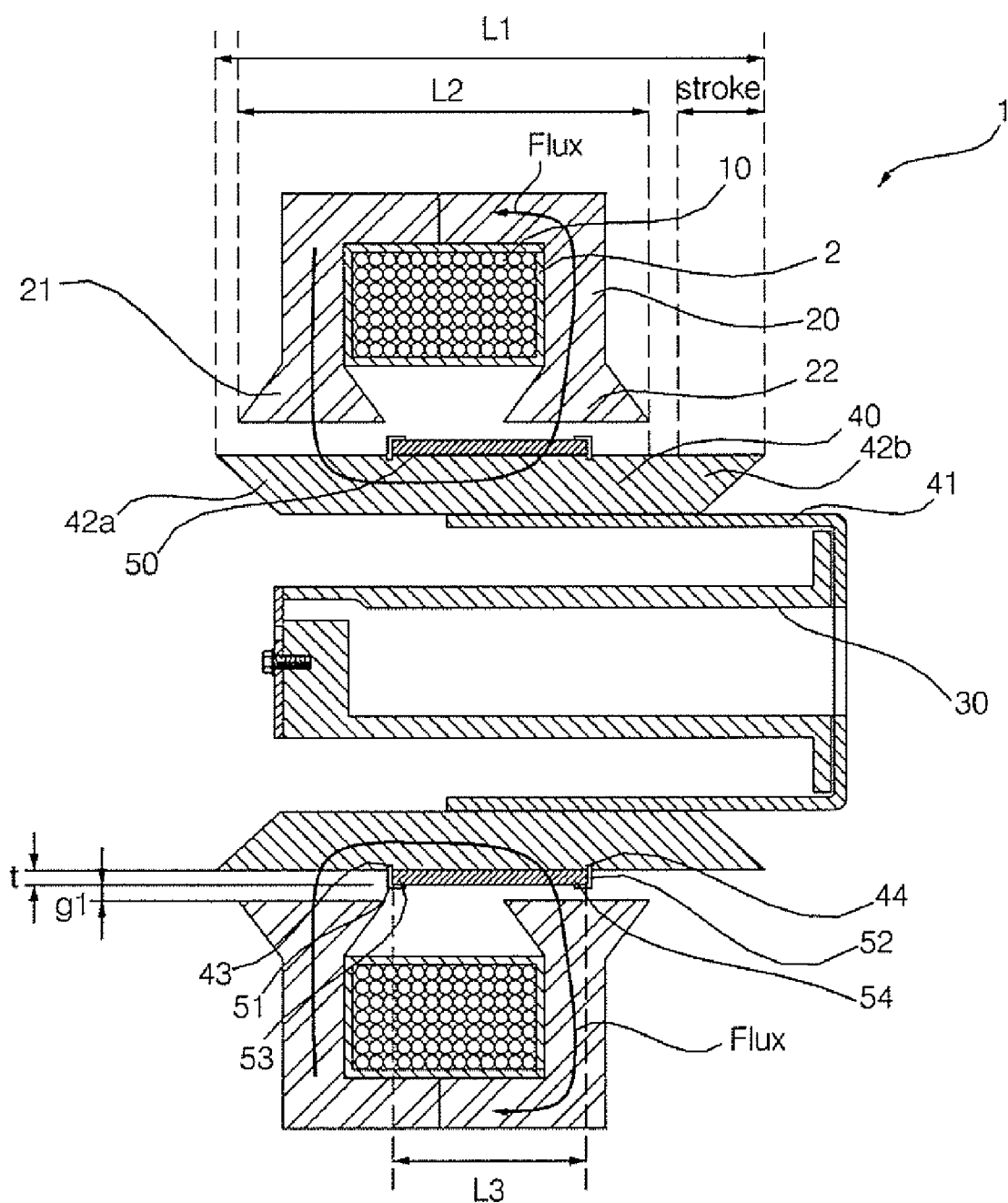
FIG. 2 is a partially longitudinal cross-sectional view illustrating a state where the moving body is withdrawn to the maximum in an embodiment of the linear motor according to the present invention.
Figure 3:
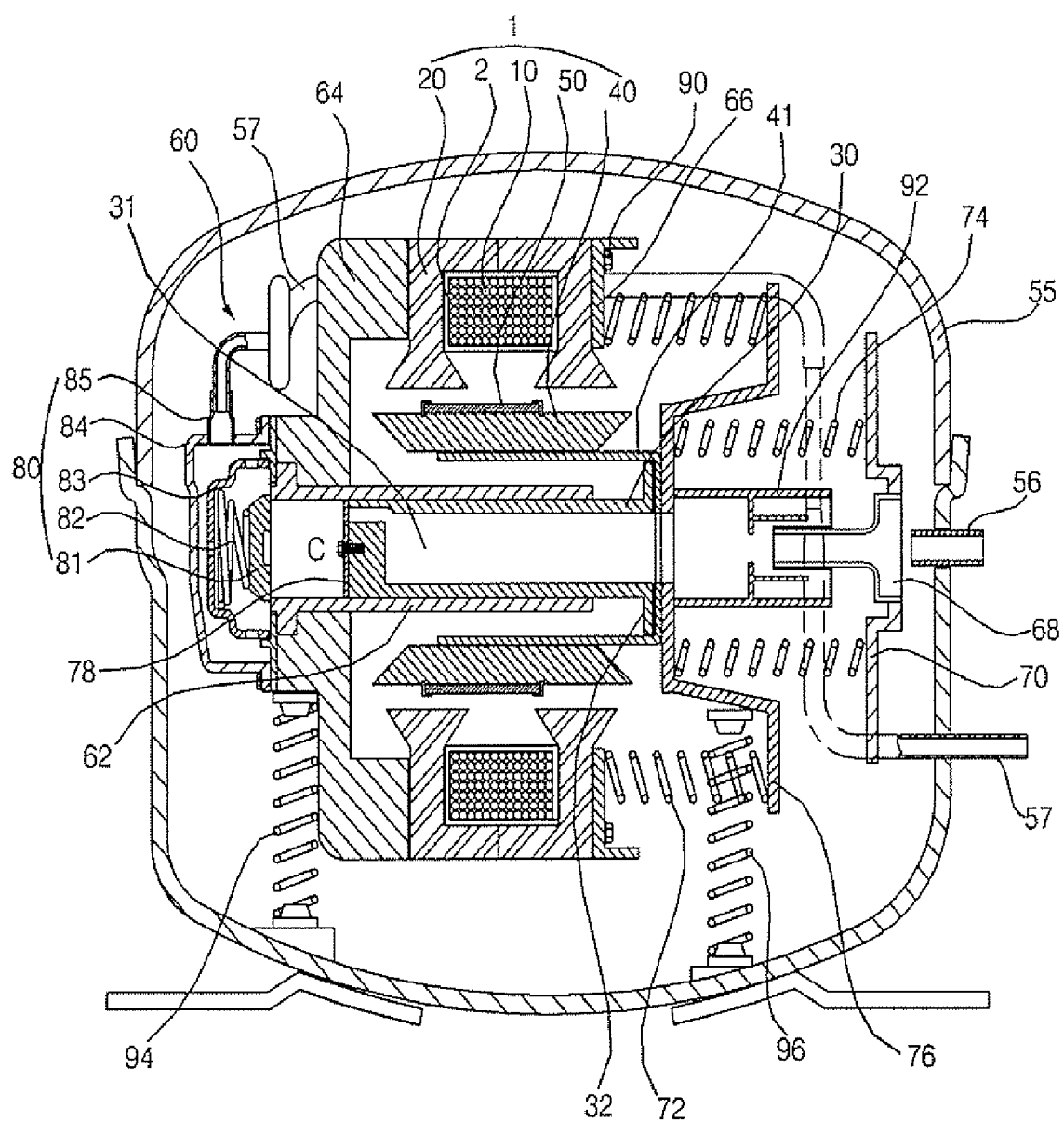
FIG. 3 is a longitudinal cross-sectional view illustrating an embodiment of a linear compressor using the linear motor according to the present invention.

FIG. 1 is a partially longitudinal cross-sectional view illustrating a state where a moving body is advanced to the maximum in an embodiment of a linear motor according to the present invention;

FIG. 2 is a partially longitudinal cross-sectional view illustrating a state where the moving body is withdrawn to the maximum in an embodiment of the linear motor according to the present invention; and FIG. 3 is a longitudinal cross-sectional view illustrating an embodiment of a linear compressor using the linear motor according to the present invention.

A linear motor 1 shown in FIGS. 1 and 2 includes a bobbin 2, a coil 10 wound in the bobbin 2, an outer core 20 provided about the bobbin 2, an inner core 40 provided so that a moving body 30 such as a piston, etc. performs a linear reciprocating motion. The inner core 40 has a length longer than the outer core 20, and a magnet 50 is provided in the inner core 40 and having a gap between the magnet 50 and the outer core 20.

The bobbin 2 is entirely formed in a cylinder shape and an outer circumferential surface thereof is opened. Of course other shapes can be utilized.

The coil 10 is wound at the inside of the bobbin 2.

The outer core 20 forms a passage of a magnetic flux when an alternating current flows to the coil 10 and a plurality of outer cores are radially disposed spaced from the bobbin 2.

The outer core 20 is formed to surround a part of the bobbin 2 and a front and rear poles 21 and 22 are disposed spaced from each other in the front and the rear at the inner circumference of the outer core.

The moving body 30 is a piston or a rod, etc. for performing a linear reciprocating motion and is not limited to this kind of a body.

Here, the non-limiting description of the moving body will be referred to as a piston.

The inner core 40 forms a passage of a magnetic flux together with the outer core 20 and iron cores are radially stacked.

The inner core 40 may be directly coupled to the piston 30 so that a linear reciprocating force of the magnet 50 may be directly delivered to the piston 30 and is also possible to be provided in a separate core frame 41 coupled to the piston 30 so that a linear reciprocating force of the magnet 50 may be delivered to the piston 30 through the core frame 41.

Now, the inner core 40 is provided on an outer circumferential surface of the core frame 41 and this will be described.

The inner core 40 may be bonded on the outer circumferential surface of the core frame 41 by an adhesive, fastened by a fastening member such as a screw, or locked by a projection or a groove, etc.

In the inner core 40, a front pole 42a is formed at a front end thereof and a rear pole 42b is formed at a rear end thereof.

If an entire length L1 of the inner core 40 has a length smaller than the sum of a length L2 of the outer core 20 and a stroke of the moving body 30, a reluctance force that is a reverse force increases in a direction to minimize a gap between the inner core 40 and the outer core 20, i.e., a direction opposite to movement of the magnet 50 and the inner core 40, when the inner core 40 and the magnet 50 are moved. To avoid this problem according to an aspect of the present invention the inner core 40 has a length L1 equal to or longer than the sum of a length L2 of the outer core 20 and a stroke of the moving body 30.

That is, the inner core 40 has the length L1 equal to or longer than the sum of the length L2 of the outer core 20 and a stroke of the moving body 30. It is most preferable that the inner core 40 has a length equal to the sum of the length L2 of the outer core 20 and a stroke of the moving body 30 so as to minimize a material cost of the inner core 40.

The magnet 50 is positioned in close contact with the outer circumferential surface of the inner core 40 and is magnetized in a cylindrical direction. If a direction of a magnetic flux passing through the outer core 20 and the inner core 40 changes in accordance with a direction of an alternating current flowing to the coil 10, the magnet 50 receives a force for performing a linear reciprocating motion in the front-rear direction by a Fleming's left-hand rule and this force is delivered to the moving body 30 through the inner core 40 and the core frame 41.

The magnet 50 may be directly adhered by an adhesive, etc., adhered by hardening during one hour at a high temperature after taping with a carbon film, etc., or be maintained in close contact by separate holders 51 and 52, on the outer circumferential surface of the inner core 40.

Now, a structure in which the magnet 50 is in close contact with the inner core 40 by the holders 51 and 52 will be described in detail.

A first holder 51 in which a front end 53 of the magnet 50 locks in a front and an outside surrounding direction by surrounding the front end 53 of the magnet 50 and a second holder 52 in which a rear end 54 of the magnet 50 locks in a rear and an outside surrounding direction by surrounding the rear end 54 of the magnet 50 are fastened to the inner core 40.

In order to fasten the first holder 51 and the second holder 52 to the inner core 40, front and rear grooves 43 and 44 are disposed spaced from each other in the front and the rear on the outer circumferential surface of the inner core 40.

The first holder 51 is formed in a ring shape and a portion surrounding the front end 53 of the magnet 50 has a cross-section of a ˙ ┌ shape and a portion thereof is fixed to the front groove 43 by welding or a C ring, etc. after being inserted into the groove 43 so that the front end 53 of the magnet 50 comes in contact with the outer circumferential surface of the inner core 40.

The second holder 52 is formed in a ring shape and a portion surrounding the rear end 54 of the magnet 50 has a cross-section of a ┐ shape opposite to the first holder 51 and a portion thereof is fixed to the front groove 43 by welding or a C ring, etc. after being inserted into the groove 43 so that the rear end 54 of the magnet 50 comes in contact with the outer circumferential surface of the inner core 40.

That is, the magnet 50 is locked by the first holder 51 and the second holder 52 in a length direction and an outside direction to come in contact with the outer circumferential surface of the inner core 40.

On the other hand, when the magnet 50 performs a linear reciprocating motion together with the inner core 40, the linear motor has a reluctance force for moving the inner core 40 to the center. When the magnet 50 moves out of poles 21 and 22 of the outer core 20, a reluctance force generated by the magnet 50 increases. These two forces are offset by each other due to their opposite directions so that linearity in a linear reciprocating motion improves and its efficiency increases.

That is, upon performing a linear reciprocating motion, the magnet 50 has a length L3 in which the front and rear ends 53 and 54 are out of at least one of the front and rear poles 21 and 22 of the outer core 20.

Specifically, the magnet 50 has a relatively short length so that the rear end 54 of the magnet 50 is out of the front end of the rear pole 22 of the outer core 20 when the magnet 50 advances to the front to the maximum, and the front end 53 of the magnet 50 is out of the rear end of the front pole 21 of the outer core 20 when the magnet 50 withdraws to the rear to the maximum. Also the magnet 50 may have a relatively long length so that the front end 53 of the magnet 50 is out of the front end of the front pole 21 of the outer core 20 when the magnet 50 advances to the front to the maximum and the rear end 54 of the magnet 50 is out of the rear end of the rear pole 22 of the outer core 20 when the magnet 50 withdraws to the rear to the maximum.

The linear motor is disposed in the order of the piston 30, the core frame 41, the inner core 40, the magnet 50, the outer core 20, and an assembly of the bobbin 2 and the coil 10.

Now, an operation of a linear motor having the above-mentioned construction will be described in detail.

First, if an alternating current is applied to the coil 10, a magnetic flux flows to the outer core 20 and the inner core 40 while changing a direction of the magnetic flux.

A force for performing a linear reciprocating motion in the front-rear direction is generated in the magnet 50 by the changed magnetic flux direction and a linear reciprocating motion of the magnet 50 is delivered to the piston 30 through the inner core 40 and the core frame 41, so that the magnet 50, the inner core 40, and the piston 30 integrally perform a linear reciprocating motion.

At this time, because the inner core 40 has a length L1 longer than the sum of a length L2 of the outer core 20 and a stroke of the moving body 30, a reverse force is not generated in a direction opposite to movement of the magnet 50, so that the linear motor can generate the maximum output.

On the other hand, a force (output) of the linear motor having the above-mentioned construction is determined by a motor force constant (a) and a current value (i) applied to the coil 10, where the motor force constant (a) is proportional to a magnetic flux density (Bm) within a gap by the magnet 50.

Because there is no separate gap g2 between the magnet 50 and the inner core 40 as the magnet 50 is in contact with the outer circumferential surface of the inner core 40, a magnetic flux density (Bm) within a gap by the magnet 50 is determined as shown in Equation 2.

$$Bm = Br \times t / 2(g1+t) \quad \text{<Equation 2>}$$

where Br is a magnetic flux density (characteristic) within a magnet, t is a thickness of the magnet, and $2(g1+t)$ is a gap of a linear motor.

That is, in the linear motor, a magnetic flux density within a gap increases by $2(g1+t)/2(g1+g2+t)$ than when there is a separate gap g2 between the magnet 50 and the inner core 40, so that its output increases in the same magnet amount and the magnet 50 is less used for the same output.

In the linear compressor shown in FIG. 3, a flow channel 31 for conveying a fluid such as a gas refrigerant to the piston 30 is provided in a lengthwise direction.

The linear compressor includes a shell 55 forming an external appearance or housing and a linear compressing part 60 is provided with a device to absorb a shock at the inside of the shell 55 and including the linear motor 1 and the piston 30.

At one side of the shell 55, a suction pipe 56 for sucking (i.e. intaking) a fluid is mounted and at the other side thereof, a roof pipe 57 for discharging a fluid compressed in the linear compression part 60 is mounted.

The linear compression part 60 includes a cylinder 62 provided so that the piston 30 performs a linear reciprocating motion, a cylinder block 64 provided outside of the cylinder 62 and disposed at the front of the outer core 20, an outer cover 66 disposed in the rear of the outer core 20, a rear cover 70 which is fastened to the outer cover 66 and in which a fluid suction hole 68 is formed, and a spring supporter 76 which is provided in a rear end of the piston 30 and in which a first spring 72 is interposed between the spring supporter 76 and the outer cover 66 and in which a second spring 74 is interposed between the spring supporter 76 and the rear cover 70.

In the linear compression part 60, the piston 30, the cylinder 62, the core frame 41, the inner core 40, the magnet 50, and an assembly of the outer core 20, the bobbin 2, and the coil 10 are disposed in that order towards the outside from the center.

At the rear end of the piston 30, a flange 32 is protruded so that the core frame 41 and the spring supporter 76 can be fastened by a fastening member such as a screw, etc.

On the other hand, the linear compression part 60 further includes a suction valve 78 provided on an entire surface of the piston 30 to switch a flow channel 31 of the piston 30, and a discharge valve assembly 80 which is provided in the cylinder block 64 so as to be positioned at the opposite side of the piston 30 to form a compression chamber (C) within the cylinder 62 and which opens or shuts the front of the cylinder 62 by an internal pressure of the compression chamber (C).

The suction valve 78 has a structure of opening or shutting the flow channel 31 by elastically bending and is fastened by a screw, etc. on the front surface of the piston 30.

The discharge valve assembly 80 includes a discharge valve 81 for opening and shutting a front end of the cylinder 62, an inside discharge cover 83 in which a discharge spring 82 for elastically supporting the discharge valve 81 is provided, an outside discharge cover 84 in which a flow channel is formed between the outside discharge cover 84 and the inside discharge cover 83, and a discharge pipe 85 provided in the outside discharge cover 84 to connect the roof pipe 57.

Reference numeral 90 shown in FIG. 3 indicates a fastening bolt fastened by penetrating in the order of the outer cover 66 and the cylinder block 64 and reference numeral 92 indicates a silencer provided in a rear end of the piston 30.

Reference numeral 94 shown in FIG. 3 indicates a front damper elastically supporting the cylinder block 64 in the shell 55 and reference numeral 96 indicates a rear damper elastically supporting the spring supporter 76 in the shell 55.

Now, an operation of a linear compressor having the above-mentioned construction will be described in detail.

First, the linear compressor generates a large force as the first spring 72 and the second spring 74 are amplified by resonance when the piston 30 withdraws. At this time, in the suction valve 78, the flow channel 31 is opened by a pressure difference between the compression chamber (C) and the flow channel 31 of the piston 30 and a fluid such as a refrigerant gas within the flow channel 31 is sucked to the compression chamber (C).

The linear compressor generates a large force as the first spring 72 and the second spring 74 are amplified by resonance when the piston 30 advances. At this time, in the suction valve 78, the flow channel 31 of the piston 30 is closed by a fluid sucked to the compression chamber (C) and its own elastic force and a fluid within the compression chamber (C) is compressed by pressing of the piston 30 and the suction valve 78 and discharged through the discharge valve assembly 80 and the roof pipe 57.

At this time, a fluid within the shell 55 is sucked to the flow channel 31 of the piston 30 by passing through the fluid suction hole 68 of the rear cover 70 and the silencer 92 with a negative pressure formed in the flow channel 31 of the piston 30.

A linear motor and a linear compressor using the linear motor according to the present invention having the above-mentioned construction have the following effects.

In the linear motor and the linear compressor using the linear motor according to the present invention having the above-mentioned construction, an inner core is provided to perform a linear reciprocating motion with a moving body and a magnet is provided in the inner core so that the inner core and the moving body perform a linear reciprocating notion and has a gap between the magnet and an outer core and does not have a gap between the magnet and the inner core, so that it is possible to minimize an amount of using the magnet in the same performance or increase their output when an amount of using the magnet is the same. Further, as the inner core is formed to be longer than the outer core, a reverse force generated in a direction opposite to movement of the magnet can be minimized when the magnet performs a linear reciprocating motion, so that it is possible to minimize an output decrease which can be generated when the inner core is equal to or shorter than the outer core.

Furthermore, in the linear motor and the linear compressor using the linear motor according to the present invention, because the inner core has a length longer than the sum of a length of the outer core and a stroke of the moving body, a reverse force is not generated in a direction opposite to movement of a magnet when the magnet performs a linear reciprocating motion, so that it is possible to prevent an output decrease.

Furthermore, the linear motor and the linear compressor using the linear motor according to the present invention further includes a core frame which is coupled to the moving body and in which the inner core is provided, so that it is possible to easily provide the inner core when it is difficult to directly provide the inner core in the moving body.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A linear motor comprising:
   a bobbin;
   a coil wound in the bobbin;
   an outer core provided on the bobbin;
   an inner core configured to perform a linear reciprocating motion together with a moving body, the inner core having a length thereof longer than the outer core; and
   a magnet provided on the inner core so that the inner core and the moving body perform a linear reciprocating motion, the magnet configured to provide a gap between the magnet and the outer core.

2. The linear motor of claim 1, wherein the length of the inner core is configured to be longer than a sum of a length of the outer core and a stroke of the moving body.

3. The linear motor of claim 1, wherein the magnet is provided to be in close contact with an outer circumferential surface of the inner core.

4. The linear motor of claim 3, wherein the magnet is adhered to the outer circumferential surface of the inner core by an adhesive or a carbon film.

5. The linear motor of claim 1, wherein the magnet is configured such that one end of the magnet is out of one pole of the outer core when the moving body is advanced to a maximum amount or is withdrawn to a maximum amount.

6. The linear motor of claim 1, further comprising a first holder and a second holder which are provided on an outer circumferential surface of the inner core,
   wherein the first holder is configured to lock in a front end portion of the magnet by surrounding a front end surface and a circumferential outer surface of the front end portion, and
   the second holder is configured to lock in a rear end portion of the magnet by surrounding a rear end surface and a circumferential outer surface of the rear end portion.

7. The linear motor of claim 1, further comprising a core frame configured to be coupled to the moving body,
   the inner core provided on the core frame.

8. The linear motor of claim 7, wherein the inner core is bonded on an outer circumferential surface of the core frame by an adhesive or fastened by a fastening member.

9. The linear motor of claim 7, wherein the cylinder is located radially outwardly of the piston, the core frame is located radially outwardly of the cylinder, the inner core is located radially outwardly of the core frame, the magnet is located radially outwardly of the inner core, the outer core is located radially outwardly of the magnet, and an assembly of the bobbin and coil is located radially outwardly of the outer core.

10. A linear compressor comprising:
    a cylinder;
    a piston positioned in the cylinder to perform a linear reciprocating motion;
    a bobbin;
    a coil wound in the bobbin;
    an outer core provided on the bobbin;
    an inner core configured to perform a linear reciprocating motion together with the piston, the inner core having a length thereof longer than the outer core; and
    a magnet provided with the inner core so that the inner core and the piston perform a linear reciprocating motion, the magnet configured to provide a gap between the magnet and the outer core.

11. The linear compressor of claim 10, wherein the length of the inner core is configured to be equal to or longer than a sum of a length of the outer core and a stroke of the piston.

12. The linear compressor of claim 10, wherein the magnet is provided to be in close contact with an outer circumferential surface of the inner core.

13. The linear motor of claim 12, wherein the magnet is adhered to the outer circumferential surface of the inner core by an adhesive or a carbon film.

14. The linear motor of claim 10, wherein the magnet is configured such that one end of the magnet is out of one pole of the outer core when the moving body is advanced a maximum amount or is withdrawn a maximum amount.

15. The linear compressor of claim 10, further comprising a first holder and a second holder which are provided on an outer circumferential surface of the inner core,
    wherein the first holder is configured to lock in a front end portion of the magnet by surrounding a front end surface and a circumferential outer surface of the front end portion, and the second holder is configured to lock in a rear end portion of the magnet by surrounding a rear end surface and a circumferential outer surface of the rear end portion.

16. The linear compressor of claim 15, wherein the inner core has a front groove provided on the outer circumferential surface to fasten the first holder and a rear groove provided on the outer circumferential surface to fasten the second holder, and wherein the front groove and the rear groove are spaced from each other in a front-rear direction.

17. The linear compressor of claim 10, further comprising a core frame configured to be coupled to the piston and provided with the inner core thereon.

18. The linear compressor of claim 17, wherein the inner core is bonded on an outer circumferential surface of the core frame by an adhesive or fastened by a fastening member.

19. The linear compressor of claim 17, wherein the piston, the cylinder, the core frame, the inner core, the magnet, the outer core, and an assembly of the bobbin and the coil are arranged in this order from a center of the linear compressor.

20. A linear compressor comprising:
- a cylinder;
- a piston provided in the cylinder to perform a linear reciprocating motion, the piston provided with a flow channel that a fluid passes through;
- a suction valve provided in a front surface of the piston to open or shut the flow channel of the piston;
- a bobbin;
- a coil wound in the bobbin;
- an outer core provided on the bobbin;
- an inner core provided to perform a linear reciprocating motion together with the piston, the inner core having a length thereof longer than the outer core;
- a magnet provided with the inner core so that the inner core and the piston perform a linear reciprocating motion, the magnet configured to provide with a gap between the magnet and the outer core;
- a cylinder block provided at an outside of the cylinder and disposed in front of the outer core;
- an outer cover provided in a rear of the outer core;
- a rear cover fastened in the outer cover, the rear cover provided with a fluid suction hole formed therein;
- a spring supporter provided in a rear end of the piston, the spring supporter comprising a first spring interposed between the outer cover and the spring supporter and a second spring interposed between the rear cover and the spring supporter; and
- a discharge valve assembly provided in the cylinder block to form a compression chamber within the cylinder and opening or shutting the cylinder by an internal pressure of the compression chamber.

21. The linear compressor of claim 20, wherein the length of the inner core is longer than a sum of a length of the outer core and a stroke of the piston.

22. The linear compressor of claim 20, wherein the magnet is provided in close contact with an outer circumferential surface of the inner core.

23. The linear motor of claim 22, wherein the magnet is adhered to the outer circumferential surface of the inner core by an adhesive or a carbon film.

24. The linear motor of claim 20, wherein the magnet is configured such that one end of the magnet is out of one pole of the outer core when the moving body is advanced a maximum amount or is withdrawn a maximum amount.

25. The linear compressor of claim 20, further comprising a first holder and a second holder which are provided on an outer circumferential surface of the inner core,
wherein the first holder is configured to lock in a front end portion of the magnet by surrounding a front end surface and a circumferential outer surface of the front end portion, and the second holder is configured to lock in a rear end portion of the magnet by surrounding a rear end surface and a circumferential outer surface of the rear end portion.

26. The linear compressor of claim 25, wherein the inner core has a front groove provided on the outer circumferential surface to fasten the first holder and a rear groove provided on the outer circumferential surface to fasten the second holder and
wherein the front groove and the rear groove are spaced from each other in a front-rear direction.

27. The linear compressor of claim 20, further comprising a core frame configured to be coupled to the piston and provided with the inner core thereon.

28. The linear compressor of claim 27, wherein the inner core is bonded on an outer circumferential surface of the core frame by an adhesive or fastened by a fastening member.

29. The linear compressor of claim 27, wherein the cylinder is located radially outwardly of the piston, the core frame is located radially outwardly of the cylinder, the inner core is located radially outwardly of the core frame, the magnet is located radially outwardly of the inner core, the outer core is located radially outwardly of the magnet, and an assembly of the bobbin and coil is located radially outwardly of the outer core.

* * * * *